United States Patent
Minafò et al.

(10) Patent No.: US 10,049,831 B2
(45) Date of Patent: Aug. 14, 2018

(54) MODULAR TRIGGER ASSEMBLY

(71) Applicant: DATALOGIC IP TECH S.R.L., Lippo di Calderara di Reno (IT)

(72) Inventors: Giovanni Minafò, Via Due Giugno (IT); Simone Paolizzi, Via San Gottardo (IT)

(73) Assignee: DATALOGIC IP TECH S.R.L., Lippo di Calderara di Reno (BO)

( * ) Notice: Subject to any disclaimer, the term of this patent is extended or adjusted under 35 U.S.C. 154(b) by 0 days.

(21) Appl. No.: 14/869,266

(22) Filed: Sep. 29, 2015

(65) Prior Publication Data
US 2017/0092442 A1   Mar. 30, 2017

(51) Int. Cl.
| | |
|---|---|
| *G06K 7/08* | (2006.01) |
| *G06K 7/10* | (2006.01) |
| *G06K 19/06* | (2006.01) |
| *H01H 13/14* | (2006.01) |
| *H01H 13/04* | (2006.01) |
| *H01H 13/50* | (2006.01) |

(52) U.S. Cl.
CPC ......... *H01H 13/14* (2013.01); *G06K 7/10881* (2013.01); *H01H 13/04* (2013.01); *H01H 13/50* (2013.01); *G06K 7/08* (2013.01); *G06K 7/10* (2013.01); *G06K 19/06* (2013.01); *H01H 2223/04* (2013.01)

(58) Field of Classification Search
CPC ........ H01H 13/04; H01H 13/14; H01H 14/50; G06K 7/08; G06K 7/10881; G06K 7/10; G06K 19/06
See application file for complete search history.

(56) References Cited

U.S. PATENT DOCUMENTS

| | | | | |
|---|---|---|---|---|
| 5,477,942 A | * | 12/1995 | Shea | B66B 1/462 187/395 |
| 5,598,082 A | * | 1/1997 | Gilpin | G06K 7/10881 200/293.1 |
| 5,687,915 A | * | 11/1997 | Schmitz | A62C 13/64 239/530 |
| 5,767,502 A | * | 6/1998 | Ferland | G06K 7/10881 200/343 |
| 5,828,052 A | * | 10/1998 | Reynolds | G06K 7/10881 235/472.01 |
| 5,850,078 A | * | 12/1998 | Giordano | G06K 7/10881 235/462.27 |
| 5,869,840 A | * | 2/1999 | Helton | G06K 7/10851 235/472.01 |
| 6,321,990 B1 | * | 11/2001 | Giordano | G06K 7/10633 235/462.45 |
| 6,592,040 B2 | | 7/2003 | Barkan et al. | |

(Continued)

OTHER PUBLICATIONS

European Search Report dated Feb. 16, 2017 in European Patent Application No. 16191229.0, 8 pages.

*Primary Examiner* — Daniel Walsh
(74) *Attorney, Agent, or Firm* — Shook, Hardy & Bacon L.L.P.

(57) ABSTRACT

A trigger assembly and scanner terminal are described. The trigger assembly includes two parts. A rigid first part stores a pressure sensitive switch and a printed circuit board. An elastic second part contacts the pressure sensitive switch in response to a level of pressure applied to the trigger assembly. The first part and second part are formed from a continuous piece.

23 Claims, 8 Drawing Sheets

(56) References Cited

U.S. PATENT DOCUMENTS

| | | | | |
|---|---|---|---|---|
| 7,306,156 B2* | 12/2007 | Wulff | G06F 3/0202 | 235/462.43 |
| 7,360,707 B2* | 4/2008 | Barkan | G06K 7/10881 | 235/454 |
| 7,497,382 B2* | 3/2009 | Mitelman | G06K 7/10851 | 235/454 |
| 7,673,804 B1* | 3/2010 | Hinson | G06K 7/10881 | 235/462.45 |
| 8,134,430 B2* | 3/2012 | Chen | H01H 21/10 | 200/401 |
| 8,226,001 B1* | 7/2012 | Foo | G06K 19/06206 | 235/449 |
| 8,421,608 B2 | 4/2013 | Lerner et al. | | |
| 8,424,768 B2* | 4/2013 | Rueblinger | G06K 7/10881 | 235/462.01 |
| 9,576,173 B1* | 2/2017 | Mao | G06K 7/10881 | |
| 9,710,804 B2* | 7/2017 | Zhou | G06Q 20/322 | |
| 9,792,478 B2* | 10/2017 | Mao | G06K 7/10881 | |
| 2002/0008963 A1* | 1/2002 | DiBene, II | G06F 1/18 | 361/720 |
| 2002/0171625 A1* | 11/2002 | Rothchild | G06F 3/03549 | 345/156 |
| 2003/0229344 A1* | 12/2003 | Dycus | A61B 18/1445 | 606/51 |
| 2003/0234291 A1* | 12/2003 | Wulff | G06F 3/0202 | 235/462.48 |
| 2004/0198241 A1* | 10/2004 | Crawford | G06F 1/1632 | 455/90.1 |
| 2005/0235482 A1* | 10/2005 | Deaett | H01P 11/00 | 29/600 |
| 2006/0019075 A1* | 1/2006 | Myoung | H05K 3/4691 | 428/209 |
| 2006/0186209 A1* | 8/2006 | Narendra | G06K 19/06187 | 235/492 |
| 2006/0193970 A1* | 8/2006 | Myung | C23C 26/00 | 427/96.1 |
| 2007/0034700 A1* | 2/2007 | Poidomani | G06K 19/0702 | 235/492 |
| 2007/0069024 A1* | 3/2007 | Barkan | G06K 7/10881 | 235/454 |
| 2007/0119948 A1* | 5/2007 | Mitelman | G06K 7/10851 | 235/462.48 |
| 2008/0078837 A1* | 4/2008 | Morris | G06K 7/10881 | 235/462.44 |
| 2008/0110737 A1* | 5/2008 | Chen | H01H 21/10 | 200/401 |
| 2009/0026054 A1* | 1/2009 | Lee | H01H 5/02 | 200/335 |
| 2009/0241931 A1* | 10/2009 | Masse | F41B 11/62 | 124/76 |
| 2009/0266897 A1* | 10/2009 | Drzymala | G06K 7/10881 | 235/472.01 |
| 2010/0258631 A1* | 10/2010 | Rueblinger | G06K 7/10881 | 235/462.48 |
| 2012/0044074 A1* | 2/2012 | Mulla | G06Q 10/08 | 340/572.1 |
| 2012/0187199 A1* | 7/2012 | Poidomani | G06K 19/06206 | 235/492 |
| 2015/0041540 A1* | 2/2015 | Qu | H01Q 1/2225 | 235/439 |
| 2017/0092442 A1* | 3/2017 | Minaf | H01H 13/04 | |
| 2017/0147846 A1* | 5/2017 | Mao | G06K 7/10881 | |

* cited by examiner

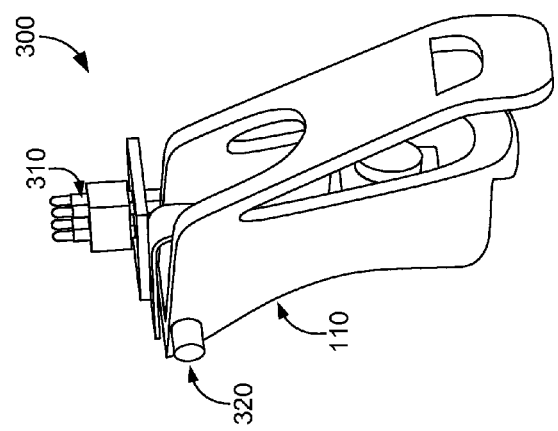
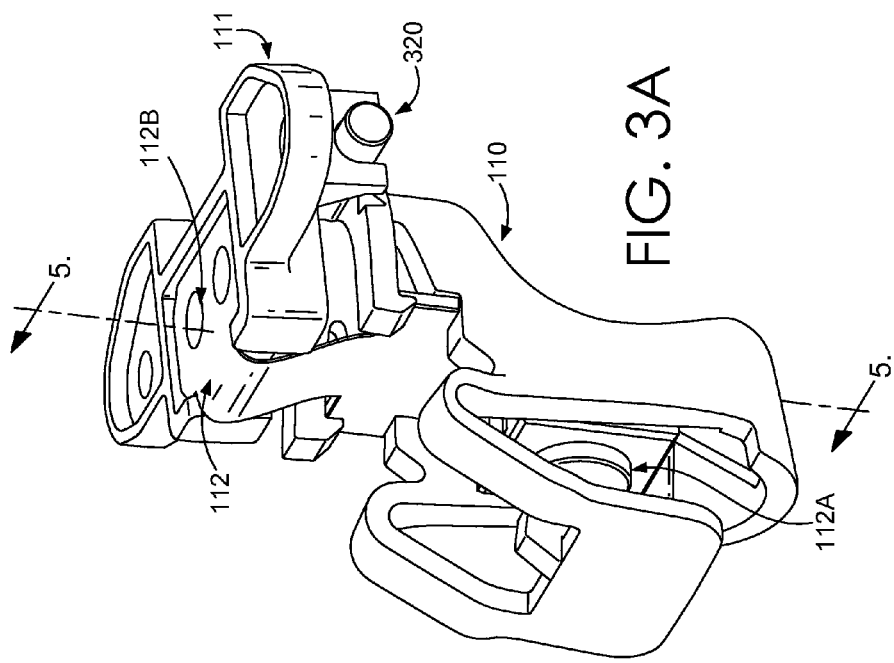

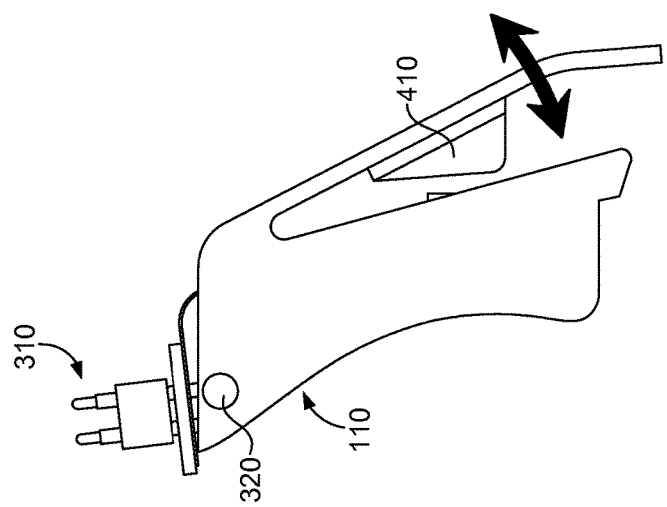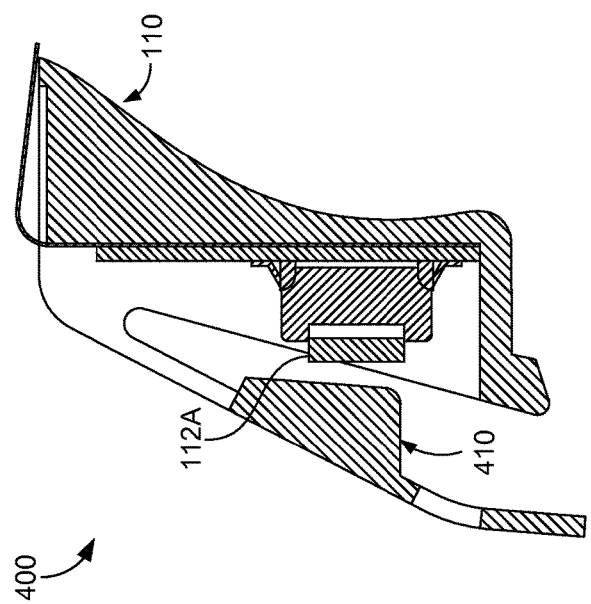

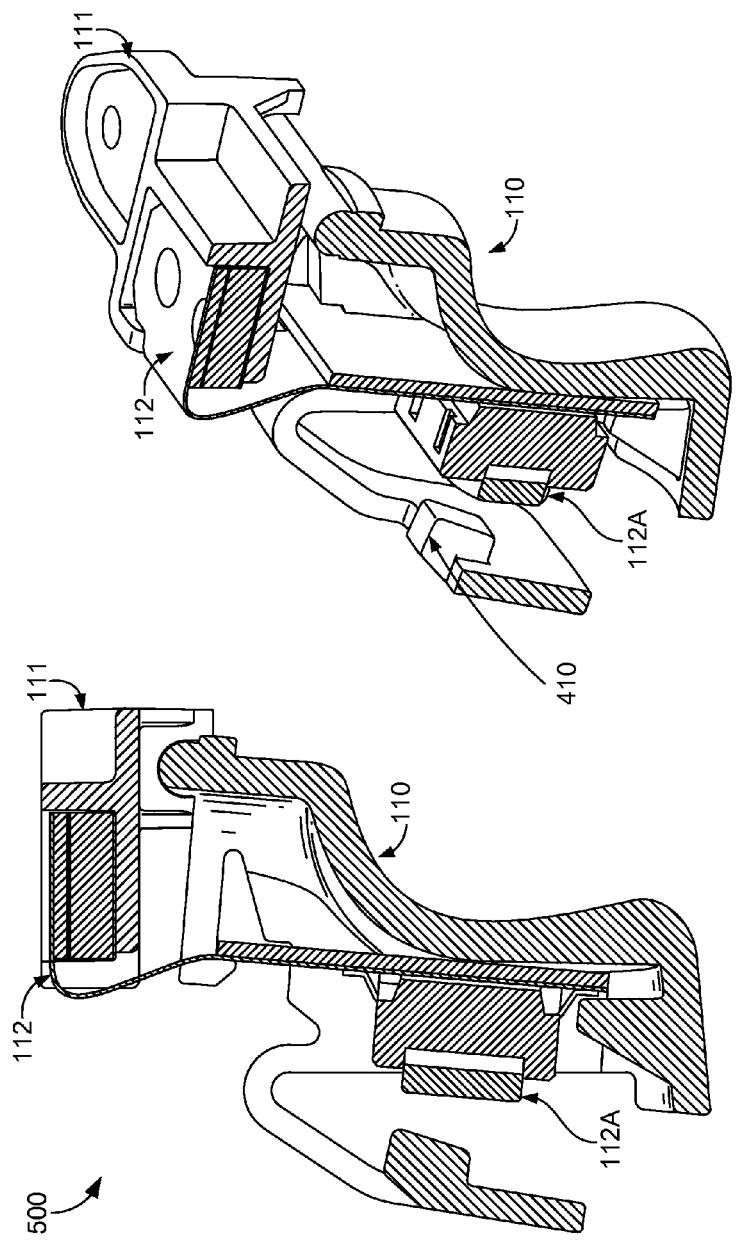

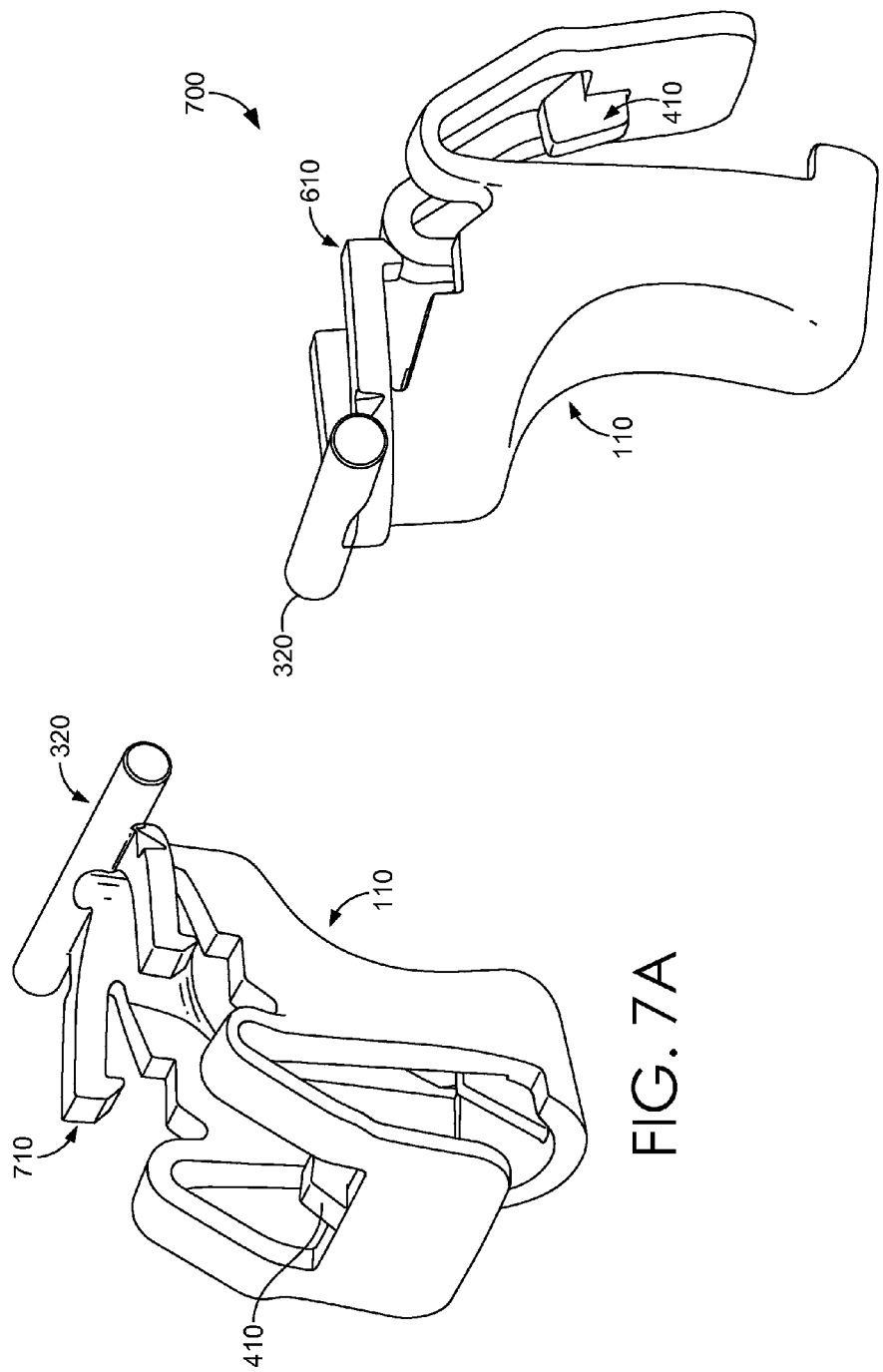

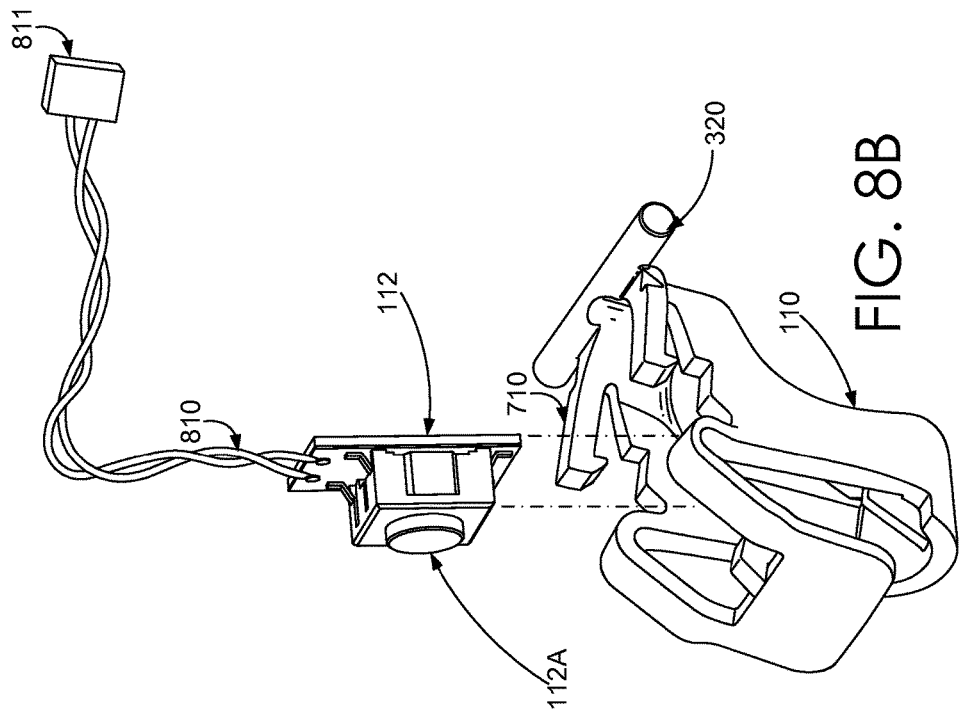
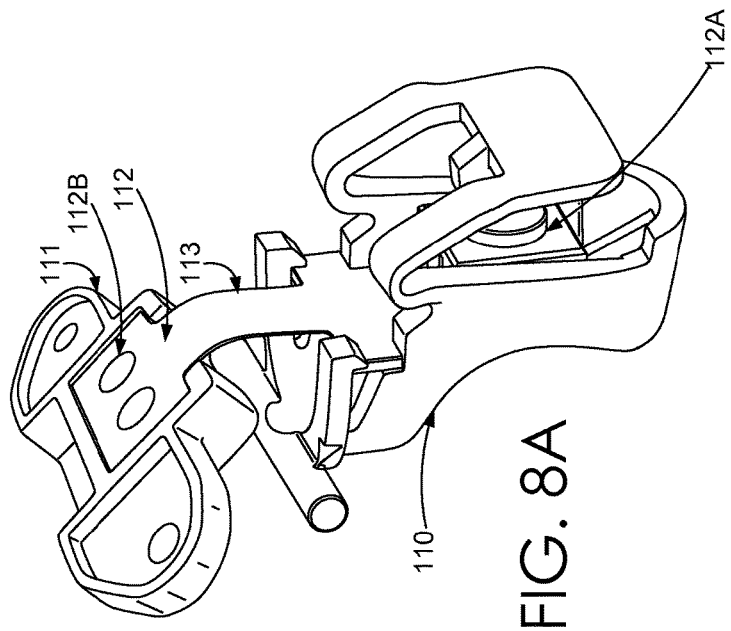

MODULAR TRIGGER ASSEMBLY

BACKGROUND

Conventional scanners process packages by reading and decoding information affixed to the packages. In some instances, the information is read and decoded as the packages move along a conveyor system. Typically, the scanners incorporate a light source and a light detector. In some conventional scanners, a trigger may be used to generate scan lines of which a portion of the light is reflected from the package and detected by the image detector and converted into an electrical signal, which is the basis for the object properties that include digital images of packages that have been read by the scanner. The digital image is processed and decoded according to the instructions executed by one or more computer processors of the conventional scanners or the conveyor system.

Triggers or buttons are used on conventional scanners. The conventional trigger consists of several electro-mechanical components that are utilized to generate a triggering signal. For instance, triggers are employed on bar code scanners and other scanning devices. The trigger may initiate certain functions on the conventional scanners. As explained above, the trigger may activate a light source and light detector to capture bar code information on a package. Additionally, the trigger may activate specific function on the conventional scanner (i.e., in some application the trigger may activate any form of communication).

Some conventional triggers may require a significant amount of labor to manufacture because of the number of moving parts and the configuration of the conventional trigger. For instance, the above-described trigger is typically hard-wired to the scanner and may not be removed. Additionally, the conventional trigger may require a user to assert a fixed amount of force and stroke to activate the conventional trigger. Thus, some users may have difficulty creating scan lines when attempting to process packages. Accordingly, the conventional trigger may have a limited number of life cycles due to wear on the various moving parts of the scanner.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Embodiments of the invention are directed to an attachable modular trigger assembly for use in a mobile scanner or similar device. The trigger assembly includes a pressure sensitive member (e.g., switch) and a trigger button. In certain embodiments, the trigger assembly includes a rigid and an elastic part that are obtained from the same piece to form an integrated trigger assembly. The switch may be housed in the rigid part of the trigger assembly. The trigger button may be connected to the elastic part of the trigger assembly.

In some embodiments, the pressure sensitive member is secured to a portion of the trigger assembly via a communication interface of a printed circuit board (PCB). The trigger button is attached to the mobile scanner in a manner such that a force applied to the trigger assembly causes a resultant force to be applied on the pressure sensitive member. The PCB is supported by the part of the trigger assembly that is opposite to the part of the trigger assembly that includes the trigger button.

The pressure sensitive member is attached to the PCB, which includes a connector that may couple to circuitry on the scanner terminal. The assertion of a force on the trigger button changes electronic properties of the pressure sensitive member. In one embodiment of the invention, asserting a force on the trigger button causes a change in the electrical resistance of the pressure sensitive member. For example, the force causes a conductive layer of the pressure sensitive member to come in contact with conductive traces within the pressure sensitive member. As the force increases (within a certain range), the electrical resistance of the conductive traces decreases.

In another embodiment of the invention, asserting a force on the trigger button causes a change in the capacitance of the pressure sensitive member. In yet another embodiment, a piezoelectric element is included in the pressure sensitive member wherein when pressure is applied to the pressure sensitive member there is a change in potential between the opposite sides of the piezoelectric element.

In another aspect of the present invention, the triggering system includes a stroke control features wherein a user may assign different actions or outputs based on the amount of force required to activate the trigger. The stroke control features may be implemented using several pressure sensitive members along the PCB in the trigger assembly.

These and other embodiments of the invention will become apparent with regard to the following description, appended claims, and accompanying figures.

BRIEF DESCRIPTION OF THE DRAWINGS

Embodiments of the invention are illustrated by way of example and not limited in the accompanying figures in which like reference numerals indicate similar elements and in which:

FIGS. 3A and 3B are a perspective diagram illustrating the exemplary trigger assembly in accordance with embodiments of the invention;

FIGS. 4A and 4B are a cross-section and side-view illustration of the exemplary trigger assembly in accordance with embodiments of the invention;

FIGS. 5A and 5B are a cross-section illustration of the exemplary trigger assembly in accordance with embodiments of the invention;

FIGS. 7A and 7B are a perspective illustration of the rigid and elastic parts of the trigger assembly in accordance with embodiments of the invention; and FIGS. 8A and 8B are a perspective diagram illustrating the alternative exemplary trigger assemblies in accordance with embodiments of the invention.

DETAILED DESCRIPTION

Figure 1:
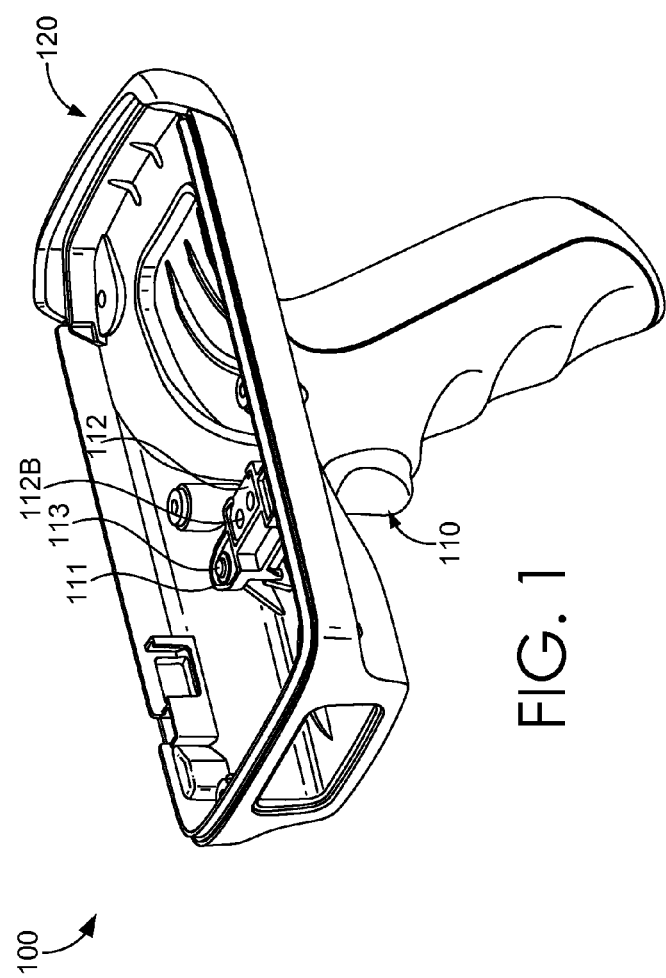
FIG. 1 is a schematic diagram of an exemplary scanner terminal with an exemplary trigger assembly in accordance with embodiments of the invention.

The subject matter of the embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

The embodiments of the scanner and trigger systems are provided to reduce manufacturing costs and improve trigger operations. A modular trigger is provided for connection with a mainboard (e.g. scanner). The modular trigger includes an elastic part and a rigid part that are manufactured from the same material (e.g. a plastic composite) and form a continuous piece. In some embodiments, the elastic part and rigid part are manufactured from different materials. For instance, the elastic part may be manufactured from plastic and the rigid part may be manufactured from steel.

The modular trigger includes a printed circuit board (PCB) that contains one or more switches. The PCB may be a structural mechanical component where electronic components, including switches, are mounted. The switches may cause the mainboard to generate a signal for a scan line that processes an object's dimensions, barcode, or other identifying information or activate a specific function on the scanner. The PCB and switch may be housed in one of the two parts (e.g. rigid or elastic) of the modular trigger.

The switch of the PCB may be activated in response to contact received from the trigger's elastic part. In one embodiment, the elastic part may include a fin-shaped member that connects with the switch. In response to a user squeezing the trigger, the fin-shaped member meets the surface of the switch and causes the motherboard of the scanner to activate one or more scan lines. Accordingly, the modular trigger simplifies and reduces assembly operations for the scanner, increases the scanner activation precision by providing improved stroke control; reduces the overall size of the trigger, and reduces the number of components and associated production, manufacturing, and assembly costs and times. The modular trigger also simplifies the management of the spare parts and the repair operations for the scanner.

Importantly, the modular trigger may be detached and replaced without any impact on other components of the scanner, in certain embodiments of the invention. The removal of the trigger assembly would not change the functionality of components like the motherboard, handle, etc. In other words, if the switch, pins, PCB or flexible printed circuit FPC break or fail, only the modular trigger assembly would be replaced to restore complete functionality to the scanner.

Throughout this patent, several acronyms and shorthand notations are used to aid the understanding of certain concepts pertaining to the associated system and services. These acronyms and shorthand notations are intended to help provide an easy methodology of communicating the ideas expressed herein and are not meant to limit the scope of the embodiments of the invention. The following is a list of these acronyms:
CPU Central Processing Unit
EAS Electronic Article Surveillance
E-ISBN Electronic International Standard Book Number
FPC Flexible Printed Circuit
ISBN International Standard Book Number
PCB Printed Circuit Board
RAM Random Access Memory
RFID Radio Frequency Identification
ROM Read-only Memory
SSCC Serial Shipping Container Code
UPC Universal Product Code A scanner may include a motherboard housed in an enclosure. The motherboard (e.g. CPU) may include one or more CPUs that trigger scan lines that process items that include barcode and other tracking information (e.g., EAS, SSCC, ISBN, E-ISBN, or UPC). A modular trigger is attachable to the motherboard and may be removed from the housing by loosening one or more fastening elements.

FIG. 1 is a schematic diagram 100 of an exemplary scanner terminal 120 with an exemplary trigger assembly 110 in accordance with embodiments of the invention.

The modular trigger assembly 110, in one embodiment, is a control element of the scanner terminal 120. For instance, the modular assembly 110 may be used to control when scan lines are generated by the scanner terminal 120. The modular trigger assembly 110 is secured to the scanner terminal 120 via a cradle 111. The cradle 111 sits on a segment of the scanner terminal 120 having a tunnel that receives a fastening member 113 (e.g., screw). The cradle 111 may also support a PCB 112 that is part of the trigger assembly 110. In some embodiments, the PCB 112 may include switch 112A (not shown) and PCB pads 112B that connect with the pins of a motherboard for a scanner. The PCB pads 112B may be apertures that receive the pins of the motherboard. In certain embodiments, upon removing the modular trigger assembly 110, a new modular trigger assembly 110 may be installed in the scanner terminal 120. Alternatively, the removed modular trigger assembly 110 may be reused in a newer scanner terminal 120 or a different model scanner terminal 120 that is configured to receive the modular trigger assembly 110.

In some embodiments, the trigger assembly may be removed from the scanner terminal. The scanner terminal may include a tunnel that receives a fastening element that secures the trigger assembly to the scanner terminal. Additionally, the scanner terminal may also provide a resting arm that allows for alignment of the trigger assembly.

Figure 2:
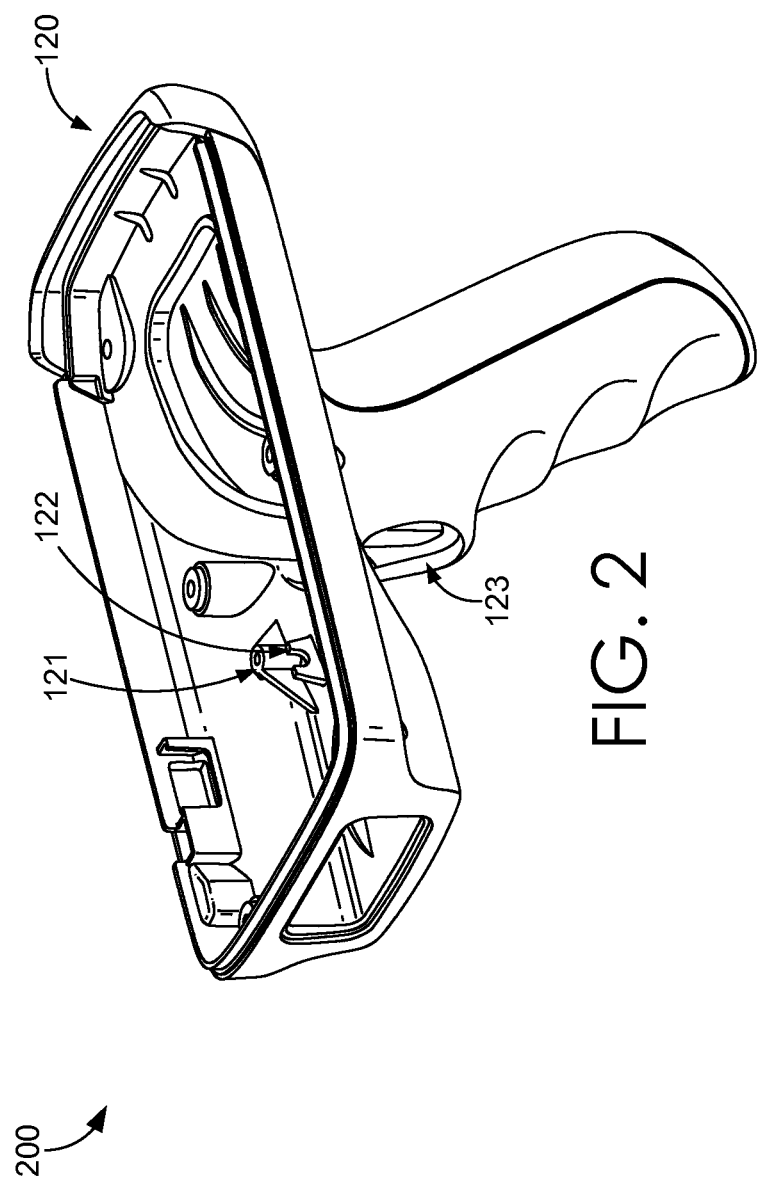
FIG. 2 is an illustration of an exemplary scanner terminal without the exemplary trigger assembly in accordance with embodiments of the invention.

FIG. 2 is a schematic diagram 200 illustrating an exemplary scanner terminal 120 without the exemplary trigger assembly 110 in accordance with embodiments of the invention. The scanner terminal 120 includes a tunnel 121, resting arm 122, and orifice 123.

The tunnel 121, in one embodiment, is a cylindrical aperture that receives a fastening member (e.g., screw or bolt) to secure the modular trigger assembly. The tunnel 121 may be positioned on two sides of the scanner terminal 120. In turn, the tunnel 121 receives the fastening elements to attach the modular trigger assembly to the scanner terminal 120.

The resting arm 122, in certain embodiments, is a U-shaped member that aligns the modular trigger assembly during installation. The resting arm 122 may be positioned on two sides of the scanner terminal 120. As the trigger assembly is installed in the scanner terminal 120, the resting arm 122 provides alignment and support, which assists as the fastening elements are secured to the tunnel 121.

The trigger assembly connects to the motherboard via connector pins. The connector pins provide an interface between the motherboard and the PCB of the trigger assembly. When the trigger assembly is activated by a user, an appropriate signal is transmitted to the motherboard to generate the scan lines.

FIGS. 3A and 3B are perspective diagrams 300 illustrating the exemplary trigger assembly 110 in accordance with embodiments of the invention. The trigger assembly 110 includes a cradle 111, a PCB 112, PCB pads 112B, and a shaft 320 as illustrated in FIG. 3A. Alternatively, the trigger assembly 110 includes cradle 111 and a PCB 112 with a cable that replaces the FPC, connector pins 310, and a shaft 320 as illustrated in FIG. 3B.

The cradle 111 supports the PCB 112, in at least one embodiment. The cradle 111 is positioned to engage the shaft 320. The cradle 111, in one embodiment, includes apertures that are aligned with the tunnels in the scanner terminal. To secure the trigger assembly 110 and the scanner terminal, the fastening member traverses the apertures in the cradle 111 and the tunnels in the scanner terminal. Accordingly, the cradle 111 keeps the PCB pads 112B aligned with the pogo pins of the motherboard.

In other embodiments, the cradle 111 may be optional. For instance, if the PCB includes a cable connection to the motherboard, the cradle 111 may be unnecessary. When trigger assembly 110 includes pins 310, the PCB 112 may be a single rigid PCB containing the switch 112A. As a consequence, the alignment function provided by the cradle 111 is necessary to properly interface with the motherboard. The cable of the PCB 112 may include the connector pins 310 that secure to the motherboard.

The PCB 112, in most embodiments, is a rigid and flexible unit. The PCB 112 is housed in the trigger assembly 110. An upper portion of the PCB 112 is positioned within the cradle 111. A lower portion of the PCB 112 is housed within a cavity of the modular trigger assembly 110. The lower portion of the PCB 112 may include a switch 112A. The switch 112A may be activated when the trigger apparatus is pulled or squeezed by a user. In turn, the signals from the switch 112A are transmitted through the PCB 112 and to the motherboard via the PCB pads 112B or the connector pins 310. In certain embodiments, the PCB 112 is a passive mechanical structure that is rigid and flexible. The PCB 112 enables transfer of electric signals generated by the switch 112A to the motherboard, where all the operations of the scanner are executed. In other embodiments, the PCB 112 may provide dynamic programming capabilities. The programming capabilities may include functionality that may alter the scan lines size, color, intensity, etc.

As illustrated in FIGS. 3A and 3B, the connection between the trigger assembly 110 and the motherboard may be made with pogo pins in at least two configurations. In a first configuration, PCB pads 112B are positioned on the PCB 112 to receive the pogo pins of the motherboard. In a second configuration, the connection pins 310 are position on the PCB 112 to mate with pads on the mainboard. The connection pins 310, in one embodiment, may be soldered to the PCB 112.

The switch 112A, in some embodiment, may be selected from any of the following pressure sensitive components: a piezoceramic element, dielectric material, or a capacitor having capacitance that is variable as a function of pressure applied, or any other pressure sensing element.

The trigger assembly 110 may include a mechanical actuator that engages the switch. In one embodiment, the mechanical actuator is a member shaped to accommodate a user's finger. The mechanical actuator may contact the switch 112A to generate an electrical signal in the PCB 112 of the trigger assembly 110. The contact may occur in response to pressure applied to the trigger assembly 110. The mechanical actuator connects with the switch in the most suitable area and maintains this "action area" during the whole stroke of the trigger assembly 110. The shape of mechanical actuator may vary from square, triangular, fin-shaped, or circular to any other suitable form that will apply a force to switch 112A when pressure is applied to the trigger assembly 110.

FIGS. 4A and 4B are a side-view illustration 400 of the exemplary trigger assembly 110 in accordance with embodiments of the invention. The trigger assembly 110 may include a mechanical actuator 410.

In one embodiment, the mechanical actuator 410 is positioned opposite from the switch 112A. The mechanical actuator 410 may be part of the elastic part of the trigger assembly 110, in at least one embodiment. In response to pressure applied to the elastic part, the mechanical actuator 410 interacts with the switch 112A, which transmits the signal to the contact pins 310 for relay to the motherboard of the scanner terminal.

The trigger assembly may include a plastic part and a metal part, in at least one embodiment. The plastic part may be joined to the metal part to form the trigger assembly. In some embodiments, the plastic part may be preloaded to provide additional sensitivity when pressure is applied to the trigger assembly.

FIGS. 5A and 5B are a cross-section illustration 500 of the exemplary trigger assembly 110 in accordance with embodiments of the invention. The trigger assembly 110 includes a cradle 111, PCB 112, and mechanical actuator 410. The trigger assembly 110, in one embodiment, may include a plastic part and a metal part.

The trigger assembly 110 stores a segment of the PCB 112 and switch 112A in a container. The container may be shaped to receive a finger that applies force to the trigger assembly. In at least one embodiment, the container stores the switch 112A and may be a serpentine-shaped metal part of the trigger assembly 110. The other segment of the PCB 112 is seated in the cradle 111. In the elastic part of the trigger assembly 110, the mechanical actuator 410 is positioned to contact the switch 112A in response to an appropriate level of pressure.

In one embodiment, the cradle and PCB may be removed from the trigger assembly. For instance, the PCB may need updating to provide additional stroke functionality. The PCB may be need repositioning in the cradle depending on the type of adhesive used to secure it to the cradle.

Figure 6B:
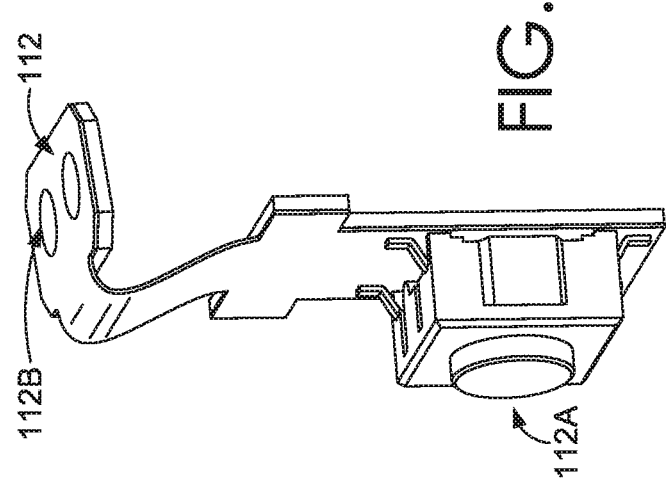
FIGS. 6A and 6B are a perspective illustration of a cradle and printed circuit board of the trigger assembly in accordance with embodiments of the invention.
Figure 6A:
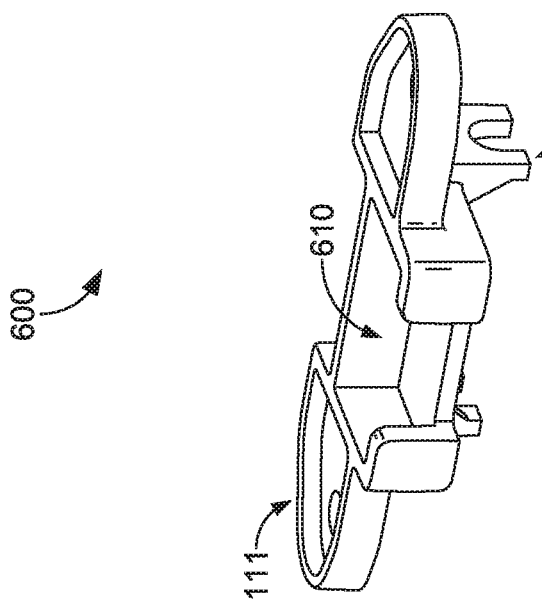

FIGS. 6A and 6B are a perspective illustration 600 of the cradle 111 and printed circuit board 112 of the trigger assembly in accordance with embodiments of the invention. The cradle 111 provides a cavity 610 that receives the PCB 112. The cavity 610 may include an adhesive material that secures the PCB 112 to the cradle 111. The cradle 111 also includes an alignment member 620 that is n-shaped. The alignment member 620 may be used to align the cradle 111 with the scanner terminal and to guide and secure the shaft 320 during rotation around the resting arm 122.

The PCB 112 may include at least one switch. For instance, to add additional scan line functionality, the PCB 112 may include additional switches 112A. The additional switches 112A may trigger multiple functions on the motherboard of the scanner terminal 120. The multiple functions may include narrow scans, wide scans, long scans, short scans, etc.

The trigger assembly shell without the cradle and PCB may be fabricated from the same material, in certain embodiments. The material may be produced with different elasticity. The assembly shell may be produced with different materials having different elasticity. For instance, one segment of the trigger assembly may be rigid while another segment of the trigger assembly is elastic. The fin-shaped member that activates the switch may be fabricated as an integral piece of the elastic part of the trigger assembly.

FIGS. 7A and 7B are a perspective illustration 700 of the rigid and elastic parts of the trigger assembly 110 in accordance with embodiments of the invention. The trigger assembly 110 may include the mechanical actuator 410 and hook 710. The fin-shaped member 410 may be fabricated from the same material used to make the elastic part of the trigger assembly 110. The hook 710 secures the PCB when it is installed in the housing of the trigger assembly 110. The trigger assembly 110 may include a shaft 320 that is an integral part of the trigger assembly 110. The shaft 320 may allow the cradle and scanner terminal to align during installation and fastening.

FIGS. 8A and 8B are perspective diagrams illustrating alternative exemplary trigger assemblies in accordance with embodiments of the invention. The trigger assembly 110 includes a cradle 111, a PCB 112, PCB pads 112B, FPC 113 and a shaft 320 as illustrated in FIG. 3A. The FPC 113 connects the PCB 113 to PCB pads 112B. Alternatively, the trigger assembly 110 includes hook 710 that secures the PCB 112 when it is installed in the housing of the trigger assembly 110. The PCB 112 with a cable 810 and connector 811 replaces the FPC 113 and pins 310 as illustrated in FIG. 8B. The cable 810 attaches the PCB 112 to the connector 811, which interfaces with the motherboard of the scanner terminal.

In summary, embodiments of the invention provide a full functionality modular trigger. The different modular triggers may vary according to needs of the application for the scanner terminal. For example, the modular trigger may be replaced to accommodate the following: spring force, spring stroke, number of switches, trigger type (e.g. for dust or waterproof environments), trigger color, and any other customization requested for the application. Accordingly, the same trigger assembly may be compatible and mounted on different scanner terminals.

The printed circuit board can be mounted on the modular trigger assembly by fasteners, which include but are not limited to, screws, adhesive tapes, or snaps. The choice of the mounting method depends on several factors including: the designer's needs, cost, and market and environmental requirements. In some embodiments, the printed circuit board may be connected to the mainboard of the device by connectors that include any of the following: wires, flexible circuits, pogo pins, or spring contacts.

One of ordinary skill in the art understands that the shape of the trigger assembly and of the elastic part of the trigger may be changed, as long as the trigger assembly functionalities are guaranteed. Additionally, in other embodiments, several switches may be included in the trigger assembly to detect short or long strokes.

The trigger assembly in some embodiments may meet at least one standard for waterproof and dustproof (e.g. IP40). In one embodiment, the trigger assembly consists of at least the following parts: 1) rigid part (e.g. surface for the pressure of the trigger), elastic part, pin for the rotation and snaps for the PCB locking; 2) bus: two rigid PCBs, and a flexible circuit. One rigid PCB contains the switch and the second rigid PCB contains the pogo pins pads for the connection to the motherboard; 3) Cradle: two holes for the screws, seats for the rotational pin and housing for the PCB. In some embodiments, the cradle is an optional component as explained above. For instance, if the PCB includes a cable connection to the mother board, the cradle may be unnecessary.

The rigid part of the trigger assembly contains the switch and is easily mounted to the trigger assembly. For instance, hooks or snaps may be used to secure the rigid PCBs and the flexible circuit in the trigger assembly. The rigid PCB, in certain embodiment, may also be attached by adhesive to the cradle. Once the trigger assembly is installed in a handle or other designated location of the scanner terminal, the cradle is fastened to the housing and the trigger assembly apparatus is completely mounted. In some other embodiments, the cradle may be manufactured as integral part of the trigger assembly.

The embodiments described above are described with respect to a trigger button on a handle on a scanner terminal. It should be recognized that the trigger assembly may be located on other areas of the scanner terminal. For instance, the trigger assembly could be located on the side or face of the scanner terminal.

The herein described embodiments of the present invention are intended to provide the preferred embodiments of the present inventions currently contemplated by the applicant. It would be obvious to one of skill in the relevant art, based on the herein described examples that numerous modifications could be made to the described preferred embodiments without straying from the present invention. Accordingly, the herein described embodiments are merely exemplary in nature and are not intended to represent every possible embodiment of the present invention.

Embodiments of the invention may be described in the general context of computer code or machine-useable instructions, including computer-executable instructions such as program modules, being executed by a computer or other machine, such as a personal data assistant, scanners, or other handheld device. Generally, program modules including routines, programs, objects, components, data structures, etc., refer to code that performs particular tasks or implements particular abstract data types. Embodiments of the invention may be practiced in a variety of system configurations, including handheld devices, consumer electronics, general-purpose computers, more specialty computing devices, etc. Embodiments of the invention may also be practiced in distributed computing environments where tasks are performed by remote-processing devices that are linked through a communications network.

The scanner device includes a bus that directly or indirectly couples the following devices: memory, one or more processors, one or more presentation components, input/output (I/O) ports, I/O components, and an illustrative power supply. The bus represents what may be one or more busses (such as an address bus, data bus, or combination thereof).

Scanning devices include one or more processors that read data from various entities such as memory or I/O components. Presentation component(s) present data indications to a user or other device. Exemplary presentation components include a display device, speaker, printing component, vibrating component, etc. The I/O ports allow computing device to be logically coupled to other devices including the I/O components, some of which may be built in. Illustrative components include a microphone, joystick, game pad, satellite dish, scanner, printer, wireless device, etc.

Embodiments of the invention include a trigger assembly. The trigger assembly includes a first part that is rigid and that stores a pressure sensitive switch; and a second part that is elastic and that contacts the pressure sensitive switch in response to a level of pressure applied to the trigger assembly, wherein the first part and second part form a continuous piece. The trigger assembly may provide one or more functions of a scanner terminal that are activated in response to the level of pressure applied.

In some embodiments, the trigger assembly includes a mechanical actuator that is included in the second part. The second part may be preloaded to provide increased sensitivity to pressure from a user of the scanner terminal. Additionally, the trigger assembly comprises a printed circuit board that connects to the pressure sensitive switch. The printed circuit board provides connectors that interface with the scanner terminal. Moreover, the printed circuit board includes a rigid portion and a flexible portion. In certain embodiments, the trigger assembly may include a cradle that secures the printed circuit board to a scanner terminal. The cradle may ensure that the trigger assembly is properly aligned in the scanner terminal. Accordingly, the components to the trigger assembly may be replaced without impacting the functionality of a motherboard or handle of the scanner terminal.

In another embodiment, a scanner terminal may include an attachable trigger assembly. The scanner terminal includes an orifice to receive the trigger assembly. As explained above, the trigger assembly includes: a rigid first part that stores a pressure sensitive switch and a printed circuit board, and an elastic second part that contacts the pressure sensitive switch in response to a level of pressure applied to the trigger assembly, wherein the first part and second part form a continuous piece. The printed circuit board may include a rigid portion and a flexible portion. The scanner terminal may provide a cradle ensures that the trigger assembly is properly aligned in the scanner terminal. Also, the cradle ensures that the trigger assembly is detachable and may be replaced with a new trigger assembly. In certain embodiments, the trigger assembly may include replaceable components.

While the embodiments of the invention are susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the embodiments of the invention.

The embodiments of the invention have been described in relation to a particular exemplary conveyor system and scanner, which are intended in all respects to be illustrative rather than restrictive. Alternative embodiments will become apparent to those of ordinary skill in the art to which the invention pertains without departing from its scope.

The technology claimed is:

1. A trigger assembly, the trigger assembly comprising:
a first part that is rigid and that stores a pressure sensitive switch that senses pressure provided thereto from a second part, and in response to the provided pressure, provides electrical signals to an optical code scanner terminal comprising the trigger assembly to control operation of the optical code scanner,
wherein the second part is elastic and contacts the pressure sensitive switch in response to a level of pressure applied to the trigger assembly, wherein the first part and second part are integrally manufactured from the same material and without fastening means provided between the first and second parts such that the first and second parts form the trigger assembly,
and wherein the trigger assembly is capable of being attached to and removed from a body of the optical code scanner terminal as a single unit.

2. The trigger assembly of claim 1, wherein one or more functions of a scanner terminal are activated in response to the level of pressure applied.

3. The trigger assembly of claim 1, further comprising a mechanical actuator that is included in the second part.

4. The trigger assembly of claim 3, wherein the second part is preloaded to provide increased sensitivity to pressure.

5. The trigger assembly of claim 1, further comprising a printed circuit board that connects to the pressure sensitive switch.

6. The trigger assembly of claim 1, further comprising a cradle that secures the printed circuit board to a scanner terminal.

7. The trigger assembly of claim 6, wherein the cradle ensures that the trigger assembly is properly aligned in the scanner terminal.

8. The trigger assembly of claim 6, wherein the printed circuit board includes connectors that interface with the scanner terminal.

9. The trigger assembly of claim 6, wherein the printed circuit board includes a rigid portion and a flexible portion.

10. An integrated trigger assembly, the trigger assembly comprising:
a rigid first part that stores (1) a pressure sensitive switch that senses pressure provided thereto from a second part, and in response to the provided pressure, provides electrical signals to an optical code scanner terminal comprising the trigger assembly to control operation of the optical code scanner, and (2) a printed circuit board,
wherein the second part is an elastic part that contacts the pressure sensitive switch in response to a level of pressure applied to the trigger assembly,
and wherein the first part and second part are integrally manufactured from the same material and without fastening means provided between the first and second parts such that the trigger assembly is capable of being attached to and removed from a body of the optical code scanner as a single unit.

11. The trigger assembly of claim 10, wherein one or more functions of a scanner terminal are activated in response to the level of pressure applied.

12. The trigger assembly of claim 10, further comprising a mechanical actuator that is included in the second part.

13. The trigger assembly of claim 12, wherein the second part is preloaded to provide increased sensitivity to pressure.

14. The trigger assembly of claim 10, further comprising a cradle that secures the printed circuit board to a scanner terminal.

15. The trigger assembly of claim 14, wherein the printed circuit board includes connectors that interface with the scanner terminal.

16. The trigger assembly of claim 14, wherein the printed circuit board includes a rigid portion and a flexible portion.

17. The trigger assembly of claim 14, wherein the cradle ensures that the trigger assembly is properly aligned in the scanner terminal.

18. The trigger assembly of claim 14, wherein the components to the trigger assembly are replaced without impacting the functionality of a motherboard or handle of the scanner terminal.

19. An in optical code scanner terminal with an attachable trigger assembly, the scanner terminal comprising:
an orifice to receive the trigger assembly, wherein the trigger assembly includes:
a rigid first part that stores (1) a pressure sensitive switch that senses pressure provided thereto from a second part, and in response to the provided pressure, provides electrical signals to an optical code scanner terminal comprising the trigger assembly to control operation of the optical code scanner, and (2) a printed circuit board, wherein the second part is an elastic part that contacts the pressure sensitive switch in response to a level of pressure applied to the trigger assembly, and wherein the first part and second part are integrally manufactured from the same material and without fastening means provided between the first and second parts such that the first and second parts form a continuous piece capable of being attached and removed from a body of the optical code scanner terminal as a single unit.

20. The scanner terminal of claim 19, wherein the printed circuit board includes a rigid portion and a flexible portion.

21. The scanner terminal of claim 19, wherein a cradle ensures that the trigger assembly is properly aligned in the scanner terminal.

22. The scanner terminal of claim 19, wherein a cradle ensures that the trigger assembly is detachable and replaced replaceable with a new trigger assembly.

23. The scanner terminal of claim 19, wherein the trigger assembly includes replaceable components.

* * * * *